(12) United States Patent
Hietaniemi et al.

(10) Patent No.: US 9,080,288 B2
(45) Date of Patent: Jul. 14, 2015

(54) METHOD FOR PRODUCING PAPER, BOARD OR THE LIKE AND AGGLOMERATE

(71) Applicant: KEMIRA OYJ, Helsinki (FI)

(72) Inventors: Matti Hietaniemi, Espoo (FI); Mikko Virtanen, Helsinki (FI); Jonni Ahlgren, Espoo (FI)

(73) Assignee: KEMIRA OYJ, Helsinki (FI)

( * ) Notice: Subject to any disclaimer, the term of this patent is extended or adjusted under 35 U.S.C. 154(b) by 0 days.

(21) Appl. No.: 14/372,658

(22) PCT Filed: Jan. 16, 2013

(86) PCT No.: PCT/FI2013/050043
§ 371 (c)(1),
(2) Date: Jul. 16, 2014

(87) PCT Pub. No.: WO2013/107933
PCT Pub. Date: Jul. 25, 2013

(65) Prior Publication Data
US 2014/0360691 A1    Dec. 11, 2014

Related U.S. Application Data

(60) Provisional application No. 61/586,881, filed on Jan. 16, 2012, provisional application No. 61/586,885, filed on Jan. 16, 2012.

(30) Foreign Application Priority Data

Jan. 16, 2012  (FI) ..................................... 20125049
Jan. 16, 2012  (FI) ..................................... 20125050

(51) Int. Cl.
*D21H 17/45* (2006.01)
*D21H 17/37* (2006.01)
*C09C 3/10* (2006.01)
*C08K 3/00* (2006.01)
*D21H 21/00* (2006.01)
*D21H 21/52* (2006.01)
*C09C 1/42* (2006.01)
*C09C 1/00* (2006.01)
*C08K 3/34* (2006.01)
*C08K 9/08* (2006.01)

(52) U.S. Cl.
CPC ............ *D21H 17/375* (2013.01); *C08K 3/0033* (2013.01); *C08K 3/346* (2013.01); *C08K 9/08* (2013.01); *C09C 1/0081* (2013.01); *C09C 1/0084* (2013.01); *C09C 1/42* (2013.01); *C09C 3/10* (2013.01); *D21H 17/45* (2013.01); *D21H 17/455* (2013.01); *D21H 21/00* (2013.01); *D21H 21/52* (2013.01); *C01P 2004/50* (2013.01); *C01P 2004/61* (2013.01); *C01P 2006/12* (2013.01)

(58) Field of Classification Search
USPC ....................................................... 162/168.3
See application file for complete search history.

(56) References Cited

U.S. PATENT DOCUMENTS

2002/0100564 A1   8/2002  Harvey
2009/0267258 A1*  10/2009 Cheng et al. .................. 264/118
2011/0088861 A1   4/2011  Cheng

FOREIGN PATENT DOCUMENTS

WO    2009036271 A1   3/2009
WO    2010126712 A1   11/2010
WO    2011116253 A2   9/2011

* cited by examiner

*Primary Examiner* — Mark Halpern
(74) *Attorney, Agent, or Firm* — Thomas Horstemeyer, LLP (57) ABSTRACT

The invention relates to a method for producing paper, board or the like. In the method is obtained an aqueous filler dispersion, comprising particles of at least one first filler, the filler dispersion having a floc size distribution with original mean chord length value. The particles of the first mineral filler are brought into a contact with a cationic pre-treatment agent, which is capable of initiating flocculation of the filler particles in the dispersion, whereby a pre-treated filler dispersion comprising flocs, which comprise first mineral particles, is formed. The pre-treated filler dispersion is combined with a stock of fibers. The floc size distribution of the filler dispersion is changed with the pre-treatment agent, which is a natural and/or synthetic polymer, so that the mean chord length value increases at least with 2% from the original mean chord length value. The invention relates also to an agglomerate comprising at least one first mineral filler particle, a plurality of second mineral filler particles attached to at least one first filler particle by a pre-treatment agent, which is a natural and/or synthetic polymer. The average particle size by weight of the first mineral filler particles is 1.5-4.0 μm, the average particle size by weight of the second mineral filler particles is 0.5-2.4 μm, provided that the second mineral filler particles are smaller than the first mineral filler particles, and the mean chord length of the agglomerate is <40 μm.

22 Claims, 2 Drawing Sheets

METHOD FOR PRODUCING PAPER, BOARD OR THE LIKE AND AGGLOMERATE

CROSS-REFERENCE TO RELATED APPLICATIONS

This application is the 35 U.S.C. §371 national stage of PCT Application No. PCT/FI2013/050043, filed Jan. 16, 2013, which is herein incorporated by reference in its entirety and which also claims priority to, and the benefit of, U.S. Provisional Application No. 61/586,881, filed Jan. 16, 2012; U.S. Provisional Application No. 61/586,885, filed Jan. 16, 2012; Finnish Patent Application No. 201225049, filed Jan. 16, 2012; and Finnish Patent Application No. 201225050, filed Jan. 16, 2012, all of which are herein incorporated by reference in their entirety.

The present invention relates to a method for producing paper, board or the like, and to agglomerate according to preambles of the enclosed independent claims.

Fillers, such as clay, calcium carbonate, calcium sulphate or talc are used in paper and board making to reduce costs and to improve optical properties of paper or board, such as opacity and light reflectance. Fillers are added to the fibre stock before the headbox of a paper or board machine. For coated paper or board grades coating pigments, which comprise the same minerals which are used as fillers, may partly enter to the paper via the broke, which is recycled back to paper making process. The content of fillers and coating pigments is typically measured through ash content measurement by burning the stock or paper sample in 525° C. The base paper for uncoated fine paper and for coated fine paper is made from softwood and hardwood and its ash content is typically 18-24%. The base paper for 100% softwood based uncoated fine paper and for coated fine paper has an ash content typically 10-17%.

Increase in paper's filler content reduces the strength properties of the formed paper, as the amount of mineral material is increased and the amount of fibres is decreased in the paper. It is assumed that the filler particles interfere with the fibre-fibre bonds, and thus impair the paper strength. It has been observed that the filler particle size is an important variable influencing the paper strength, as large filler particles do not interfere with the fibre-fibre bonding as much as small filler particles. Thus, for paper strength it would be advisable to increase the size of the individual filler particles. Large individual filler particles may, however, cause problems in other parts of the papermaking process, for example they may be more difficult to retain under high shear forces and thus result in retention problems at the wet-end of the paper or board machine.

An object of this invention is to minimise or even eliminate the disadvantages existing in the prior art.

An object of the present invention is to provide an effective and simple method for increasing the filler content in paper, board or the like, while maintaining the strength properties and/or optical properties of the produced paper or board.

An object of the present invention is to increase filler content of paper or board in order to reduce papermaking costs while maintaining the strength properties of the produced paper or board.

These objects are attained with a method and an arrangement having the characteristics presented below in the characterising parts of the independent claims.

Typical method according to the present invention for producing paper, board or the like, comprises
   obtaining an aqueous mineral filler dispersion, comprising particles of at least one first mineral filler, the filler dispersion having a floc size distribution with an original mean chord length value,
   bringing a cationic pre-treatment agent capable of initiating flocculation of the filler particles in the dispersion into a contact with the particles of the first mineral filler, and forming a pre-treated filler dispersion comprising flocs, which comprise first mineral particles,
   combining the pre-treated filler dispersion with a stock of fibres, and
   changing the floc size distribution of the filler dispersion with the pre-treatment agent, which is a natural and/or synthetic polymer, so that the mean chord length value increases at least with 2% from the original mean chord length value.

Typical agglomerate according to the present invention comprises
   at least one first mineral filler particle,
   a plurality of second different mineral filler particles attached to the at least one first mineral filler particle by a pre-treatment agent, which is a natural and/or synthetic polymer, whereby
the average particle size by weight of the first mineral filler particles is 1.5-4.0 μm, the average particle size by weight of the second mineral filler particles is 0.5-2.4 μm, provided that the second mineral filler particles are smaller than the first mineral filler particles, and the mean chord length of the agglomerate is <40 μm.

Typical use of a method according to the present invention is for producing super calendered (SC) paper, lightweight coated (LWC) paper, newsprint paper, fine paper, folding boxboard, white top linerboard or white lined chipboard.

Now it has been surprisingly found out that filler content of produced paper may be significantly increased, while still maintaining the strength and optical properties of the final paper, by controllably pre-treating a mineral filler dispersion, which comprises at least one mineral filler, sometimes two or more different mineral fillers, so that the formed flocs in the mineral filler dispersion are sufficiently large, i.e. that the mean chord length value increases at least with 2% from the original mean chord length value. It was suddenly realised that the optimisation of the size of the formed filler flocs provides unexpected advantages. For example, it has been observed that the mineral filler content may be increased by 1-5% while still maintaining acceptable paper strength. When using the present invention, the light scattering coefficient for the final produced paper is kept constant or almost constant at constant filler level. Light scattering values are typically in the range of ±5%.

In this application flocculation is understood as a process of contact and adhesion whereby the particles of a dispersion form larger size clusters. "Flocculation" is used synonymously with the terms agglomeration and aggregation, and "floc" is used synonymously with the term agglomerate and aggregate. Floc is here understood as a cluster, comprising at least two, preferably a plurality of primary particles attached to each other by electrostatic forces, the size of the cluster being larger than the size of the individual primary mineral particles. In this application the first and second mineral filler particles are the primary particles forming the flocs.

In this application the value "average molecular weight" is used to describe the magnitude of the polymer chain length. Average molecular weight values are calculated from intrinsic viscosity results measured in a known manner in 1 N NaCl at 25° C. The capillary selected is appropriate for the viscosity value to be measured, and in the measurements of this application an Ubbelohde capillary viscometer with constant K=0.005228 was used. The average molecular weight is then calculated from intrinsic viscosity result in a known manner using Mark-Houwink equation $[\eta]=K \cdot M^a$, where $[\eta]$ is intrinsic viscosity, M molecular weight (g/mol), and K and are parameters given in Polymer Handbook, Fourth Edition, Volume 2, Editors: J. Brandrup, E. H. Immergut and E. A. Grulke, John Wiley & Sons, Inc., USA, 1999, p. VII/11 for poly(acrylamide-co-N,N,N-trimethyl aminoethyl chloride acrylate), 70% acrylamide. Accordingly, value of parameter K is 0.0105 ml/g and value of parameter a is 0.3. The average molecular weight range given for the parameters in used conditions is 450 000-2 700 000 g/mol, but the same parameters are used to describe the magnitude of molecular weight also outside this range.

In this application the term "cationic polymer" describes a polymer, either synthetic or of natural origin, which in the prevailing pH has an overall positive net charge. This means that the polymer may also comprise negative groups, as long as the overall charge is positive at the pH which it is used. For example, a cationic polymer may have a positive charge in acidic environment, where it is used, but lose this positive charge under neutral or basic conditions. Preferably the cationic polymer, either synthetic or of natural origin has a formal cationic net charge over the entire pH range.

According to one embodiment of the invention the average particle size by weight of the first mineral filler particles is 1.8-3.5 μm, preferably 2.0-3.0 μm, and the size of the second mineral filler particles is 0.6-2.0 μm, preferably 0.7-1.8 μm, provided that the second mineral filler particles are smaller than the first mineral filler particles. It has been observed that flocs, which provide good strength and retention properties, are obtained when the first mineral filler particles are larger than the second mineral filler particles.

According to one preferred embodiment of the invention the floc size distribution of the mineral filler dispersion is changed with the pre-treatment agent so that the mean chord length value increases 2-100%, typically 3-60%, preferably 5-40% from the original mean chord length value. In this application the term "mean chord length" describes particle size which has been measured by using Focused Beam Reflectance Measurement (FBRM). All the floc size values in this application have been measured by using Focused Beam Reflectance Measurement (FBRM), the measurement range of the device being 1-1000 μm. Used FBRM apparatus is Lasentec FBRM Model D600L by Laser Sensor Technology, Redmond, Wash., USA, Serial No. 1106, and its detector is D600L-HC22-K, Serial No. 961. A more detailed description of the floc size measurements is given in the experimental section.

According to one embodiment of the invention the pre-treatment agent is a water-soluble synthetic polymer having an average molecular weight (MW) in the range 200 000-5 000 000 g/mol, preferably 350 000-4 000 000 g/mol, more preferably <2 000 000 g/mol, still more preferably 500 000-1 900 000 g/mol. It has been observed that the size of the formed flocs or aggregates can be optimised by using a water-soluble synthetic polymer, preferably a synthetic cationic polymer, with a relatively low average molecular weight. In this context water-soluble means that no solid precipitate or sediment can be observed and no phase separation is occurring in the aqueous polymer solution.

Pre-treatment agent is typically used as an aqueous dispersion. The pre-treatment agent may be added to the mineral filler dispersion comprising at least one mineral filler. In case two or more different mineral fillers are used, the pre-treatment agent may be added to the mineral filler dispersion comprising at least two different mineral fillers, or the mineral filler dispersion comprising at least two different mineral fillers may be added to the aqueous solution of the pre-treatment agent, or the pre-treatment agent may be mixed simultaneously with a first mineral filler dispersion comprising first mineral filler particles and a second mineral filler dispersion comprising second mineral filler particles. Typically the pre-treatment agent is brought simultaneously into a contact with a first mineral filler dispersion flow comprising a first mineral filler and a second mineral filler dispersion flow comprising a second mineral filler, whereafter the resulting dispersion of pre-treated filler is introduced to the stock of fibres. Thus the pre-treatment agent solution and the mineral filler dispersion are mixed together and the filler flocs are formed before the resulting dispersion mixture is introduced to the fibre stock. This means that normally the pre-treatment of the mineral filler dispersion is performed on-line by mixing at least two mineral filler dispersion flows with the pre-treatment agent solution flow just before the pre-treated mineral filler dispersion is added to the fibre stock. Typically the introduction of the pre-treatment agent to the mineral filler dispersion comprising at least one mineral filler is performed <10 minutes, preferably <30 seconds, more preferably <20 seconds, before the addition of the pre-treated mineral filler dispersion to the stock.

According to one embodiment of the invention the pre-treatment agent is added to the white water and the white water is circulated back to the fibre stock preparation. The white water comprises filler(s) from recycled coated broke and/or unretained added filler(s) and it is circulated back from the paper machine to the fibre stock preparation. Thus the white water comprises filler minerals and fibre fines, which have length <0.2 mm. According to one preferred embodiment the pre-treatment agent is brought into a contact with the particles of at least first mineral filler or with the particles of the first and the second mineral filler, i.e. with a mineral filler dispersion, in an aqueous environment which is substantially fibre free, i.e. comprising solely fibrous material having length of <0.2 mm, which means that the environment does not comprise fibrous material having length of >0.2 mm. Thus the adsorption of the pre-treatment agent to the fibre surface may be avoided and the formation filler flocs or agglomerates optimised.

Typically the pre-treatment agent is added to the aqueous filler dispersion in an amount of at minimum 0.01 weight-%. The dosage amount may be of 0.01-0.5 weight-%, preferably 0.02-0.1 weight-%, calculated from the dry solids weight of the filler dispersion.

The pre-treatment agent may be a synthetic polymer, which is selected from a group consisting of polyacrylamide (PAM), glyoxalated polyacrylamide (GPAM), polyethyleneimine (PEI), polyamine, polyvinylamine (PVAM), polydiallyldimethylammonium chloride (poly-DADMAC), DADMAC-acrylamide copolymer, polyamidoamine epihalohydrin (PAE) and any of their mixtures. Polyacrylamide may be cationic, anionic or amphoteric, preferably cationic.

Typically the charge density of the pre-treatment agent is 0.1-7 meq/g, preferably 0.2-5 meq/g, more preferably 0.5-2 meq/g, determined at pH 7.

According to one preferred embodiment of the invention the pre-treatment agent is a cationic polyacrylamide having a molecular weight (MW) in the range of 200 000-2 000 000 g/mol. According to one preferred embodiment of the present invention the pre-treatment agent is or it comprises cationic polyacrylamide having an average molecular weight (MW) in the range of 400 000-2 000 000 g/mol, typically 400 000-1 900 000, more typically 500 000-1 900 000, preferably 1 000 000-1 900 000, more preferably 1 200 000-1 900 000 g/mol. Cationic polyacrylamide may be produced by copolymerising acrylamide with a cationic monomer or methacrylamide with a cationic monomer. The cationic monomer may be selected from the group consisting of methacryloyloxyethyl-trimethylammonium chloride, acryloyloxyethyltrimethylammonium chloride, methacrylamidopropyltrimethylammonium chloride, acrylamidopropyltri methylammonium chloride, diallyldimethylammonium chloride, dimethylaminoethyl acrylate, dimethylaminoethyl methacrylate, dimethylaminopropylacrylamide, dimethylaminopropylmethacrylamide, or a similar monomer. According to one preferred embodiment of the invention cationic polyacrylamide is copolymer of acrylamide or methacrylamide with methacryloyloxyethyltrimethyl ammonium chloride. Cationic polyacrylamide may also contain other monomers, as long as its net charge is cationic and it has an acrylamide/methacrylamide backbone. An acrylamide or methacrylamide based polymer may also be treated after the polymerisation to render it cationic, for example, by using Hofmann or Mannich reactions.

Cationic polyacrylamide may be prepared by conventional radical-initiation polymerisation methods. The polymerisation of the cationic polyacrylamide may be performed by using solution polymerisation in water, gel-like solution polymerisation in water, aqueous dispersion polymerisation, dispersion polymerisation in an organic medium or emulsion polymerisation in an organic medium. The cationic polyacrylamide final product may be obtained either as an emulsion in an organic medium, aqueous dispersion, or as solution in water, or as a dry powder or dry granules after optional filtration and drying steps following the polymerisation. Typically cationic polyacrylamide is used as a solution, the dosing concentration of the cationic polyacrylamide being 0.01-0.5 weight-%, preferably 0.1-0.3 weight-% in the solution.

The charge density of the cationic polyacrylamide is typically 2-30 mol-%, preferably 3-20 mol-%, more preferably 5-15 mol-%. The relatively low charge density of the cationic polyacrylamide assists the formation of filler flocs with suitable, preferred size.

In this application the term "natural polymer" describes a compound, which is of natural origin, but which may either be used as unmodified or modified. The pre-treatment agent may be a natural polymer, which is a polysaccharide, such as starch, chitosan, cellulose, or any of its cationic derivatives, preferably cationic starch. According to one embodiment of the invention the pre-treatment agent is high cationic starch, which has a degree of substitution, DS, >0.06, typically >0.07, preferably >0.1, more preferably 0.07-0.3, still more preferably 0.1-0.2. The high cationic starch is preferably only slightly degraded or non-degraded, and modified solely by cationisation. Most preferably the used starch is non-degraded and non-cross-linked and modified solely by cationisation. There are a number of derivatising agents which may be used to give a positive charge density to starch. A cationic starch may have quaternary ammonium, quaternary phosphonium, tertiary sulfonium, or other corresponding substituent(s). Particularly preferred is a cationic charge, which is derivatised to contain a quaternary ammonium ion, for example by etherification of hydroxyl groups with a suitable etherifying agent having a cationic character such as the methyl chloride quaternary salt of N-(2,3-epoxypropyl)dimethylamine or N-(2,3-epoxypropyl)dibutylamine or N-(2,3-epoxypropyl)methylaniline. Suitable high cationic starches are of natural origin, for example, potato, rice, corn, waxy corn, wheat, barley, sweet potato or tapioca starch, potato starch being preferred. Suitable starches preferably have an amylopectin content >70%, preferably >75%.

The pre-treatment agent may also be a mixture of two or several synthetic and/or natural polymers, the first and second polymer having preferably different average molecular weight. According to one embodiment the pre-treatment agent comprises a cationic polyacrylamide, as described above, and a second polymer, either synthetic or of natural origin, as described above. Typically the second polymer has a lower molecular weight than the used polyacrylamide. Preferably the average molecular weight (MW) of the second polymer is <400 000 g/mol.

In case the pre-treatment agent comprises more than one polymer, any second or following polymer is added simultaneously with the first polymer to the aqueous filler dispersion. Preferably the pre-treatment agent is one single liquid solution comprising a first polymer selected from the group specified above and possible other second or following polymers.

In case two different mineral fillers are used, the first mineral filler particles are different from the second mineral filler particles in the sense that the first mineral filler particles and the second mineral filler particles have (a) different average particle size by weight, D(50), measured with Sedigraph-method referred in this application; (b) different chemical composition; and/or (c) different crystal structure. Typically the ratio between the average particle sizes of the first mineral filler particles and the second mineral filler particles is 1.05-2.0, preferably 1.1-1.6.

Sedigraph-method for particle size measurement is performed as follows:

Used apparatus is Sedigraph III 5120, Micromeritics Instrument Corporation, Norcross, Ga., USA. Sedigraph III 5120 is used for measuring the particle size distribution of pigment slurries and powders. Typical measuring range is 0.2-100 μm. Measurement is based on measuring the sedimentation rate of particles in a suspension by X-ray beam. Measured sedimentation rates are converted to particle sizes using the so-called Stokes' law. Total sample volume is 50 ml and concentration 4%. Used solvent is Daxad 23 by Micromeritics (sodium lignosulfonate, 0.02%).

According to one embodiment of the invention the first and/or second mineral filler are selected from a group consisting of ground calcium carbonate, precipitated calcium carbonate, clay, talc, gypsum, titanium dioxide, synthetic silicate, aluminium trihydrate, barium sulphate, magnesium oxide or their mixtures. Preferably the mineral fillers, which are used in making or paper or board, suitable for use in the present invention, and content of which is increased, are clay, ground or precipitated calcium carbonate, calcium sulphate, titanium dioxide, synthetic silicate or talc, or any of their mixtures. The typical particle size of the mineral filler used in the invention depends on the filler quality. Thus clay has a typical average particle diameter in the range of 500-5000 nm, sometimes 500-1000 nm, calcium carbonate in the range of 200-5000 nm, sometimes 200-400 nm, talc in the range of 1000-10 000 nm, titanium dioxide in the range of 150-1000 nm, sometimes 150-350 nm and synthetic silicate in the range of 100-1000 nm, sometimes 100-400 nm.

According to one embodiment of the invention the particle size D(50) by weight of the second mineral filler is smaller than the particle size D(50) by weight of the first mineral filler. The smaller particles of the second mineral filler are attached to the surface of the first mineral filler particle. According to one especially advantageous embodiment of the present invention the first and second filler is selected from the following combinations: GCC/clay and TiO$_2$/clay. For example, the first filler may be ground calcium carbonate and the second filler may be clay. In another embodiment the first filler may be titanium dioxide and the second filler may be clay, in which case the optical properties of the paper may be increased with increasing titanium oxide content.

Pre-treatment agent may be added to the filler dispersion in amount <1000 g/ton total amount filler, typically 10-1000 g/ton, preferably <300 g/ton, more preferably 20-300 g/ton, still more preferably 30-150 g/ton total amount filler. Total amount filler comprises here both the first filler and the second filler. In case two or more different filler are used, the total amount filler comprises here both the first, second and any consecutive filler.

According to one embodiment of the invention also inorganic colloidal particles, which have an average particle size in water <100 nm, are added to the filler dispersion in addition to the pre-treatment agent in order to improve the filler retention to the formed paper web. Inorganic colloidal particles are at least partly negatively charged particles, whose average diameter length in water is <100 nm, preferably in the range of 1 to 100 nm. The average particle diameter of inorganic colloid is in the range of 1-80 nm, preferably 1-50 nm, more preferably in the range of 1-25 nm. The specific area, (BET), which naturally depends on the particle size, is preferably in the range of 30-1000 m$^2$/g, more advantageously in the range of 100-1000 m$^2$/g. The inorganic colloidal particles have anionic groups on their surface, which groups may be e. g. counter-ions of dissolved metal cations. Typically inorganic colloidal particles are selected from a group comprising colloidal silicate particles, such as synthetic silicates; silicates of Mg- and Al-type; colloidal silica; and polysilicate microgel; polysilicic acid microgel and aluminium-modified derivatives of these. Synthetic silicates include e. g. fumed or alloyed silica, silica gel and synthetic metal silicates. Silicates of Mg- and Al-type comprise expanded clay types, i.e. smectite, such as montmorillonite, hectorite, vermiculite, baidelite, saponite and sauconite, and their silicate alloys and derivatives.

Pre-treatment agent and inorganic colloidal particles may be added to the filler dispersion either simultaneously or sequentially in any order to the filler dispersion.

The method according to invention may be used for producing super calendered (SC) paper, ultralight weight coated (ULWC) paper, light weight coated (LWC) paper, medium weight coated (MWC) paper, heavy weight coated (HWC) paper, machine finished coated (MFC) paper, uncoated woodfree (UWF) paper, woodfree coated (WFC) paper, lightweight coated (LWCO) printing paper, SC offset (SCO) printing paper, machine finished specialties (MFS), multilayer coated paper, inkjet paper, copy paper, newsprint paper, folding boxboard, white top linerboard or white lined chipboard. The method is preferably used for producing super calendered (SC) paper, lightweight coated (LWC) paper, newsprint paper, fine paper, folding boxboard, white top linerboard or white lined chipboard. Typical coated paper, such as LWC comprises mechanical pulp around 40-60 weight-%, bleached softwood pulp around 25-40 weight-% and fillers and/or coating agents around 20-35 weight-%. SC paper comprises mechanical pulp around 70-90 weight-% and long fibered cellulose pulp around 10-30%. Typical grammage values for different paper grades may be: 40-80 g/m$^2$ for SC, 40-70 g/m$^2$ for LWC, 70-130 g/m$^2$ for MWC, 50-70 g/m$^2$ for MFC, 40-200 g/m$^2$ for UWF, 70-90 g/m$^2$ for MWC, 100-135 g/m$^2$ for HWC, 40-200 g/m$^2$ for WFC. The paper or board may comprise also recycled fibres. According to one embodiment of the invention the filler content of the paper or board is increased, whereby the ash content in is >34% for super calendered (SC) paper, >25% for uncoated woodfree (UWF) and coated woodfree base paper and >15% for newsprint paper, LWC base paper and board grades, the ash content being measured by burning the stock sample completely in 525° C.

One method for producing paper, board or the like, comprises
  obtaining an aqueous dispersion comprising particles of at least one first mineral filler, the filler dispersion having an original mean chord length value,
  bringing the aqueous filler dispersion into a contact with a pre-treatment agent capable of initiating flocculation of the filler particles in the dispersion,
  combining the pre-treated, flocculated filler dispersion with a fibre stock, wherein the pre-treatment agent comprises cationic polyacrylamide which has an average molecular weight (MW) in the range of >200 000 g/mol and <2 000 000 g/mol.

Another method for producing paper, board or the like, comprises
  obtaining an aqueous filler dispersion, comprising particles of at least one first filler and at least one different second filler, the filler dispersion having a floc size distribution with original mean chord length value,
  bringing the filler dispersion into a contact with a pre-treatment agent and forming flocs, which comprise first and second filler particles,
  combining the pre-treated filler dispersion with a stock of fibres,
  changing the floc size distribution of the filler dispersion with the pre-treatment agent so that mean chord length value increases at least with 2% from the original mean chord length value.

In an embodiment a cationic polyacrylamide having a molecular weight (MW) in the range of 200 000-2 000 000 g/mol may be used as a pre-treatment agent for filler particles. It was surprisingly found out that the filler content of produced paper or board may be significantly increased, while maintaining the strength and optical properties of the final paper by pre-treating the filler dispersion with a pre-treatment agent comprising cationic polyacrylamide having an average molecular weight (MW) >200 000 g/mol and <2 000 000 g/mol. It was suddenly realised that use of cationic polyacrylamide may optimise the size of formed filler flocs and provide unexpected advantages, such as increased filler content with maintained paper strength and good light scattering coefficient for the final produced paper or board. The floc size distribution of the filler dispersion may be changed with the pre-treatment agent so that mean chord length value increases at least with 2%, typically 2-100%, more typically 3-60%, preferably 5-40% from the original mean chord length value. The aqueous filler dispersion may further comprise particles of at least one second different mineral filler, whereby are formed flocs, which comprise first filler particles and second filler particles when the pre-treatment agent is brought into a contact with the filler dispersion.

Polyacrylamide and possible second polymer may be added in any order to the filler dispersion. In case the pre-treatment agent comprises a second polymer in addition to the cationic polyacrylamide, the second polymer is added typically simultaneously with the cationic polyacrylamide to the aqueous filler dispersion. Polyacrylamide and the second polymer may be added separately but simultaneously. Preferably the pre-treatment agent is one liquid solution comprising cationic polyacrylamide and possible other polymers.

Preferably the pre-treatment agent includes solely polyacrylamide as active polymer, which has effect in filler floc formation.

The pre-treatment agent comprising cationic polyacrylamide is preferably used as an aqueous dispersion or aqueous solution, the dosing concentration of the cationic polyacrylamide being 0.01-0.5 weight-%, preferably 0.1-0.3 weight-% in the solution. It may be added to a filler dispersion, or the filler dispersion may be added to the aqueous solution of the pre-treatment agent, the filler dispersion comprising one or several fillers. Typically the pre-treatment agent brought into contact with the filler dispersion and mixed with it and the filler flocks are formed before the filler dispersion is introduced to the fibre stock. This means that normally the pre-treatment of the fillers is performed on-line by mixing filler dispersion flow with the pre-treatment agent solution flow just before the pre-treated filler dispersion is added to the fibre stock. Typically the introduction of the pre-treatment agent to the filler dispersion is performed <10 minutes, preferably <30 seconds, more preferably <20 seconds, before the addition of the pre-treated filler dispersion to the stock.

The invention is described in more detail below with reference to the enclosed schematic drawing, in which.

Figure 1:
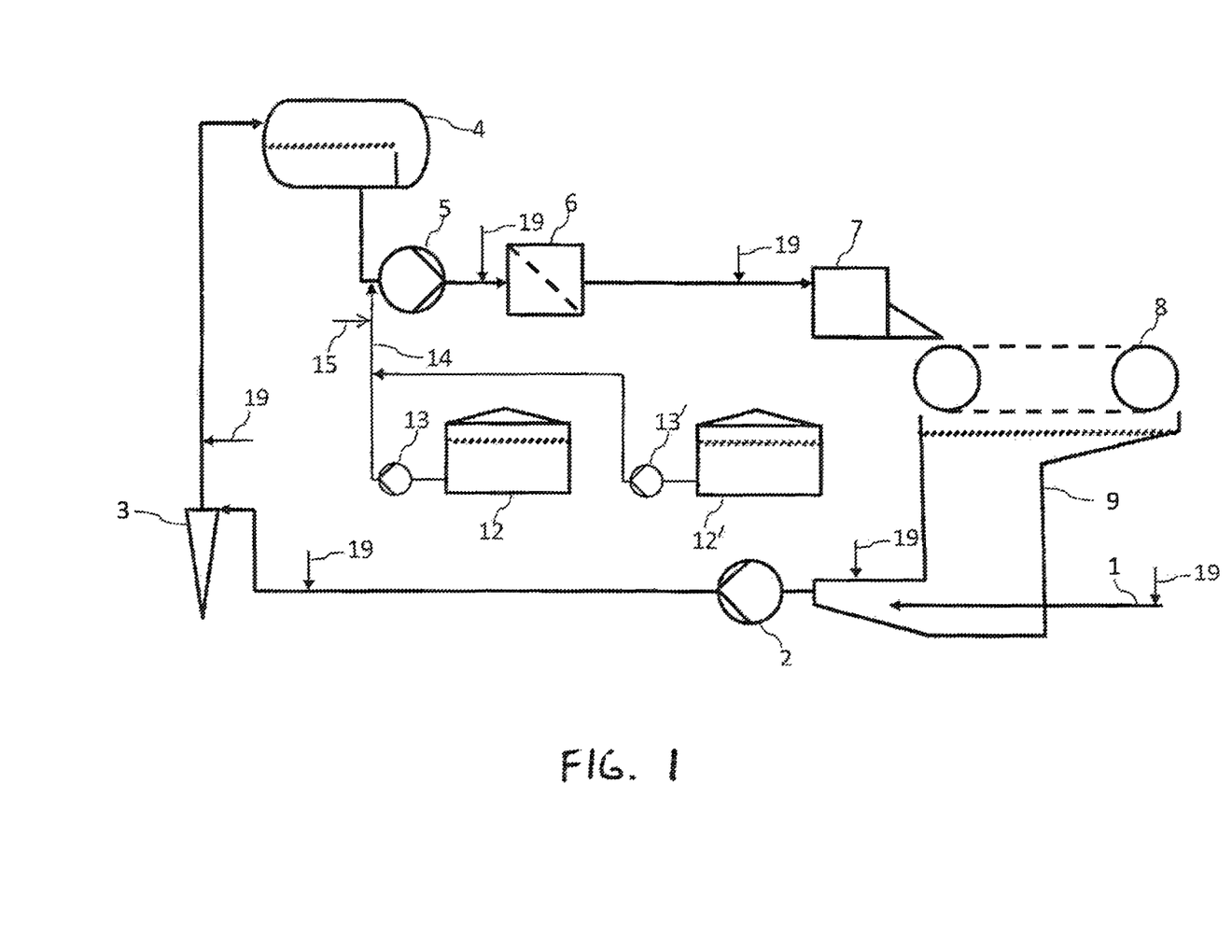
FIG. 1 shows a first embodiment of the present invention.

FIG. 1 shows an first embodiment of the present invention, where thick stock is led through thick stock pipeline 1 from preceding stock preparation stages (not shown) to off-machine silo 9. From the off-machine silo 9 thick stock is led by a primary fan pump 2 to a centrifugal cleaner 3 and from centrifugal cleaner 3 further to a deaeration unit 4. From deaeration unit 4 thick stock is fed by headbox fan pump 5 to machine screen 6 and further to headbox 7.

Filler is added to the fibre stock after deaeration unit 4. A first filler is fed from a first filler chest 12 and a second different filler is feed from a second filler chest 12' by using first and second filler pumps 13, 13'. Filler pipe 14 is connected to the pipeline transferring stock from deaeration unit 4 to machine screen 6. The flows of the first and second fillers are combined before addition of the pre-treatment agent at feeding point 15, which is located between filler chest 12 and connection point of filler pipe 14 and main stock pipeline.

From the headbox 7 the fibre stock comprising pre-treated filler is fed to wire section 8 of the paper machine.

It is also possible to add pre-treatment agent at one or several addition points 19. Suitable addition points may be selected on basis of the process, used filler and pre-treatment agent.

Figure 2:
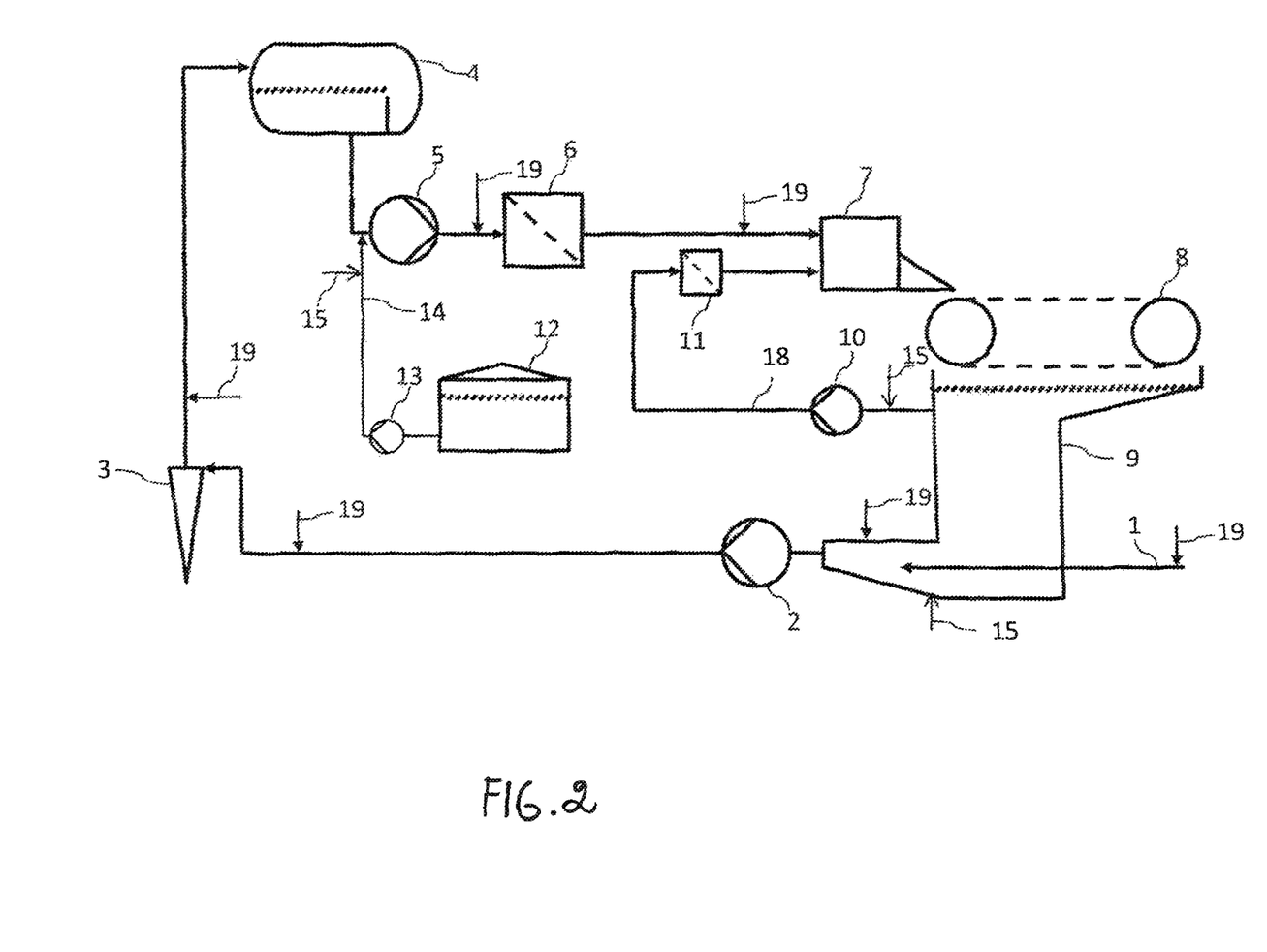
FIG. 2 shows a second embodiment.

FIG. 2 shows a second embodiment, where thick stock is led through thick stock pipeline 1 from preceding stock preparation stages (not shown) to off-machine silo 9. From the off-machine silo 9 the thick stock may be fed to a head box 7 of a paper machine through a dilution pipeline 18 and dilution screen 11. The pre-treatment agent may be added at feed points 15, either directly to off-machine silo 9 or after off-machine silo 9 but before dilution pump 10. In this case the pre-treatment agent interacts with filler particles originating from white water used for stock preparation or with filler particles present in the fibre raw material, e.g. coated broke.

Alternatively, the thick stock may be led from the off-machine silo 9 by a primary fan pump 2 to a centrifugal cleaner 3 and from centrifugal cleaner 3 further to a deaeration unit 4. From deaeration unit 4 thick stock is fed by headbox fan pump 5 to machine screen 6 and further to headbox 7. Filler is added to the fibre stock after deaeration unit 4. Filler is fed from filler chest 12 by filler pump 13 through a filler pipe 14 which is connected to the pipeline transferring stock from deaeration unit 4 to machine screen 6. Pre-treatment agent may be fed to the filler at feeding point 15, which is located between filler chest 12 and connection point of filler pipe 14 and main stock pipeline. It is also possible to add pre-treatment agent at one or several addition points 19. Suitable addition points may be selected on basis of the process, used filler and pre-treatment agent.

From the headbox 7 the fibre stock comprising pre-treated filler is fed to wire section 8 of the paper machine.

EXPERIMENTAL

General Procedure for Conducting Focused Beam Reflectance Measurement (FBRM) Tests Used FBRM apparatus is Lasentec FBRM Model D600L by Laser Sensor Technology, Redmond, Wash., USA, Serial No. 1106, and its detector is D600L-HC22-K, Serial No. 961. The FBRM instrument is a flocculation analyzer using a highly focused laser beam and back-scattered geometry as a principle of operation. From the collected data the FBRM instrument yields chord length distribution, mean of the chord length values and the number of particles detected. The measurement range of the device is adjusted to 1-1000 µm.

The following step-wise procedure is used for determining the floc size:

(1) at moment 0 s and at stirring rate of 1000 rpm a filler sample which is diluted to 1% consistency (500 ml) is poured into a dynamic drainage jar DDJ (Paper Research Materials, Inc.), (2) at moment 30 s pre-treatment agent is dosed into the filler sample, and (3) at moment 45 s floc size of the sample is measured.

The pre-treatment polymer doses are based on solids per dry matter weight of the filler, in unit's g/t. The overall consistency of filler was produced by drying it in a heating chamber at a temperature of 100-105° C.

Example 1

Example 1 illustrates pre-treatment of two fillers with a pre-treatment agent.

Filler sample is treated in the form of slurry with a desired solids content. Filler sample comprises 50% of ground calcium carbonate, GCC, under the trade name Hydrocarb 65, having average particle size D(50) 1.78 µm measured with Sedigraph-method as described, and 50% of clay under the trade name Intramax 60, having average particle size D(50) 1.98 µm measured with Sedigraph-method as described. Filler portions in the sample are based on dry solids content. Filler sample is obtained by diluting with tap water.

Two pre-treatment agents are tested. First pre-treatment agent is denoted as pre-treatment agent A, which is cationic polyacrylamide with charge 10 mol-%, and with molecular weight 1 400 000 g/mol. Second pre-treatment agent is denoted pre-treatment agent B, which comprises a) 50 weight-% of copolymer of polyacrylamide and poly-DADMAC, with charge 30 mol-% and having molecular weight 5 000 000 g/mol; and b) 50 weight-% of poly-DADMAC having molecular weight 200 000 g/mol. The pre-treatment polymer doses are based on solids per dry matter weight of the filler, unit g/t. The overall consistency of filler is produced by drying it in a heating chamber at a temperature of 100-105° C. The pre-treatment agent is added to the filler sample in form of diluted aqueous slurry and mixed with magnetic stirrer.

Mean chord length before and after pre-treatment are measured by using FBRM apparatus and procedure described above. The obtained results for mean chord length before and after pre-treatment are presented in Table 1.

TABLE 1

Mean chord length and increase of mean chord length.

| | Mean chord length (μm) | Mean chord length increase (%) |
|---|---|---|
| Conventional GCC/Clay no pre-treatment agent (Reference sample) | 9.80 | |
| Pre-treated GCC/Clay Pre-treatment agent A, dose 35 g/t | 10.11 | 3.2 |
| Pre-treated GCC/Clay Pre-treatment agent A, dose 70 g/t | 11.95 | 21.9 |
| Pre-treated GCC/Clay Pre-treatment agent B, dose 90 g/t | 12.98 | 32.4 |
| Pre-treated GCC/Clay Pre-treatment agent B, dose 240 g/t | 16.30 | 66.3 |

Example 1 shows that mean chord length increases as a function of pre-treatment agent A and B.

Example 2

Example 2 illustrates pre-treatment of one filler with a pre-treatment agent.

Filler sample comprises titanium dioxide. The particle size D(50) of titanium dioxide is 0.40 μm, measured by Sedigraph-method by using Sedigraph SED5100 and measuring the particles dispersed to water solution with 0.2% Daxad 23 as dispersant. The same pre-treatment agents A and B, as in Example 1 are used.

Mean chord length of the filler before and after pre-treatment are measured by using FBRM apparatus and procedure described above. The obtained results before and after pre-treatment are presented in Table 2.

TABLE 2

Mean chord length of untreated and pre-treated TiO$_2$ and particle size increase of pre-treated TiO$_2$.

| | Mean chord length (μm) | Mean chord length increase (%) |
|---|---|---|
| Untreated TiO$_2$, no pre-treatment agent, Reference sample | 4.83 | |
| Pre-treated TiO$_2$, Pre-treatment agent A, dose 70 g/t | 5.03 | 4.1 |
| Pre-treated TiO$_2$, Pre-treatment agent B, dose 70 g/t | 5.00 | 3.5 |

This example shows that mean chord length of titanium dioxide filler increases when treated with pre-treatment agent A or B.

Example 3

Example 3 illustrates pre-treatment of one filler with different pre-treatment agents.

Filler sample comprises precipitated calcium carbonate (PCC) which is scalenohedral shaped. The particle size D(50) of PCC is 2.2 μm, measured by Sedigrap-method by using Sedigraph SED5100 and measuring the particles dispersed to water solution with 0.2% Daxad 23 as dispersant.

Pre-treatment agents A and C are used. Pre-treatment agent A is the same, which is described in Example 1. Pre-treatment agent C is a cationic polyacrylamide with charge 10 mol-% and having molecular weight 800 000 g/mol.

Mean chord length of the filler before and after pre-treatment are measured by using FBRM apparatus and procedure described above. The obtained results before and after pre-treatment are presented in Table 3.

TABLE 3

Mean chord length, increase of mean chord length and D(90) mean chord length results obtained in Example 3.

| | Mean chord length (μm) | Mean chord length increase (%) | D(90) chord length (μm) |
|---|---|---|---|
| Untreated PCC, no pre-treatment agent, Reference sample | 5.84 | | 12 |
| Pre-treated PCC, Pre-treatment agent A, dose 70 g/t | 6.81 | 16.6 | 34 |
| Pre-treated PCC Pre-treatment agent A, dose 70 g/t | 9.26 | 58.6 | 35 |
| Pre-treated PCC Pre-treatment agent C, dose 70 g/t | 6.31 | 8.0 | 23 |
| Pre-treated PCC Pre-treatment agent C, dose 240 g/t | 7.94 | 35.9 | 24 |

The results in Table 3 show that the mean chord length increases properly as a function of pre-treatment agent A and C dosage. D(90) chord length value is relatively constant and stays in acceptable range with pre-treatment agents A and C. D(90) chord length value refers to a chord length value, 90% of particles of the sample having a chord length value lower than this value.

Example 4

Example 4 illustrates how the pre-treated filler acts as a filler in papermaking.

The fibre stock comprises thermo mechanical pulp from a paper mill, and it is diluted with tap water to 0.5% consistency.

Ground calcium carbonate, GCC, under the trade name Hydrocarb 65, having average particle size D(50) 1.78 μm measured with Sedigraph-method as described, and clay under the trade name Intramax 60 having average particle size D(50) 1.98 μm measured with Sedigraph-method as described, are used in the experiments. GCC and clay are mixed together as 50/50 proportion based on dry solids contents. The filler is treated in the form of slurry.

Filler dispersion is pre-treated with pre-treatment agent A, as described in Example 1. Two doses are tested, 35 g/t or 70 g/t, given as solids, and calculated based on dry solids content of the filler dispersion. Pre-treatment agent is added to the filler dispersion in the form of diluted aqueous slurry and mixed with magnetic stirrer.

Pre-treated filler dispersion is added to the fibre stock sample 20 s before sheet forming to achieve desired filler content of sheets. Retention aid, cationic polyacrylamide Fennopol K3400R, with charge approx. 1 meq/g and molecular weight 6 400 000 g/mol, is added to sample 10 s before hand sheet forming.

Hand sheets are prepared with Rapid-Kothen hand sheet former according to the standard ISO 5269-2:2004. Target grammage for hand sheets is 80 g/m².

Tensile strength and light scattering values are determined for hand sheet according to the standards ISO 1924-2:2008 and ISO 9416:2009. The measured values are presented in Table 4.

TABLE 4

Filler content, tensile index and light scattering values for formed hand sheets.

|  | Filler content (%) | Tensile index (Nm/g) | Light scattering (m²/kg) |
|---|---|---|---|
| Conventional GCC/Clay, no pre-treatment agent, Reference sample | 40 | 13.5 | 105.4 |
| Pre-treated GCC/Clay, Pre-treatment agent A, dose 35 g/t | 40 | 14.4 | 109.4 |
| Pre-treated GCC/Clay, Pre-treatment agent A, dose 70 g/t | 40 | 15.5 | 106.3 |

Example 5

Example 5 illustrates how the pre-treated filler acts as a filler in papermaking.

Example 5 is conducted at different time as Example 4 and different fibre stock is used. The fibre stock comprises thermo mechanical pulp from a paper mill, and it is diluted with tap water to 0.5% consistency.

Ground calcium carbonate, GCC, under the trade name Hydrocarb 65 having average particle size D(50) 1.78 µm measured with Sedigraph-method as described, and clay under the trade name Intramax 60 having average particle size D(50) 1.98 µm measured with Sedigraph-method as described, are used in the experiments. GCC and clay are mixed together as 50/50 proportion based on dry solids contents. The filler is treated in the form of slurry.

Filler dispersion is pre-treated with pre-treatment agent B, as described in Example 1. Two doses are tested, 90 g/t or 240 g/t, given as solids, and calculated based on dry solids content of the filler dispersion. Pre-treatment agent is added to the filler dispersion in the form of diluted aqueous slurry and mixed with magnetic stirrer.

Pre-treated filler dispersion is added to the fibre stock sample 20 s before sheet forming to achieve desired filler content of sheets. Retention aid, cationic polyacrylamide Fennopol K3400R, with charge approx. 1 meq/g and molecular weight 6 400 000 g/mol, is added to sample 10 s before hand sheet forming.

Hand sheets are prepared with Rapid-Kothen hand sheet former according to the standard ISO 5269-2:2004. Target grammage for hand sheets is 80 g/m².

Tensile strength and light scattering values are determined for hand sheet according to the standards ISO 1924-2:2008 and ISO 9416:2009. The measured values are presented in Table 5.

TABLE 5

Filler content, tensile index and light scattering values for formed hand sheets.

|  | Filler content (%) | Tensile index (Nm/g) | Light scattering (m²/kg) |
|---|---|---|---|
| Conventional GCC/Clay no pre-treatment agent, Reference sample | 40 | 14.3 | 106.3 |
| Pre-treated GCC/Clay Pre-treatment agent B, dose 90 g/t | 40 | 16.1 | 104.5 |
| Pre-treated GCC/Clay Pre-treatment agent B dose 240 g/t | 40 | 14.9 | 100.7 |

These examples 4 and 5 show that with pre-treated fillers it is possible to have higher tensile strength and light scattering properties for paper.

Example 6

Example 6 illustrates how pre-treated $TiO_2$ filler acts as a filler in papermaking.

The fibre stock comprising kraft pulp from a paper mill is used in the experiment, and it is diluted with tap water to 0.5% consistency. Filler is titanium dioxide, and it is treated in the form of slurry, the amount of $TiO_2$ filler in the slurry being 1.6 weight-%.

Filler dispersion is pre-treated with pre-treatment agent A or with pre-treatment agent B, described in Example 1. Three doses, 75 g/t, 150 g/t and 300 g/t, are tested for both pre-treatment agents. The doses are given as solids, and calculated based on dry solids content of the filler dispersion. Pre-treatment agent is added to the filler dispersion in the form of diluted aqueous slurry and mixed with magnetic stirrer.

Pre-treated filler dispersion is added to the fibre stock sample 20 s before sheet forming to achieve desired filler content of sheets. Retention aid, cationic polyacrylamide, with charge 1 meq/g and molecular weight 6 400 000 g/mol, is added to sample 10 s before hand sheet forming.

Hand sheets are prepared with Rapid-Kothen hand sheet former according to the standard ISO 5269-2:2004. Target grammage for hand sheets is 80 g/m².

Light scattering values and ash content are determined for hand sheet according to the standards ISO 9416:2009 and ISO 1762:2001. The measured values are presented in Table 6.

TABLE 6

Ash content and light scattering results for formed hand sheets.

|  | Ash content in paper (%) | Light scattering (m2/kg) |
|---|---|---|
| Conventional $TiO_2$, no pre-treatment agent | 2.9 | 26.5 |
| Pre-treated $TiO_2$, Pre-treatment agent A, dose 75 g/t | 3.9 | 34.2 |
| Pre-treated $TiO_2$, Pre-treatment agent A, dose 150 g/t | 4.0 | 34.0 |
| Pre-treated $TiO_2$, Pre-treatment agent A, dose 300 g/t | 4.3 | 33.9 |

TABLE 6-continued

Ash content and light scattering results for formed hand sheets.

| | Ash content in paper (%) | Light scattering (m2/kg) |
|---|---|---|
| Pre-treated TiO$_2$, Pre-treatment agent B, dose 75 g/t | 3.8 | 32.5 |
| Pre-treated TiO$_2$, Pre-treatment agent B, dose 150 g/t | 3.9 | 33.2 |
| Pre-treated TiO$_2$, Pre-treatment agent B, dose 300 g/t | 3.8 | 32.9 |

Example 6 shows that with pre-treated fillers it is possible to have high ash content in the paper while retaining or improving its scattering properties.

Even if the invention was described with reference to what at present seems to be the most practical and preferred embodiments, it is appreciated that the invention shall not be limited to the embodiments described above, but the invention is intended to cover also different modifications and equivalent technical solutions within the scope of the enclosed claims.

The invention claimed is:

1. Method for changing floc size distribution of a filler dispersion with a pre-treatment agent in producing paper or board, comprising
    obtaining an aqueous mineral filler dispersion, comprising particles of at least one first mineral filler, the filler dispersion having a floc size distribution with an original mean chord length value,
    bringing a cationic pre-treatment agent, which initiates flocculation of the filler particles in the dispersion, into a contact with the particles of the first mineral filler, and forming a pre-treated filler dispersion comprising flocs, which comprise first mineral particles,
    combining the pre-treated filler dispersion with a stock of fibres, wherein
    the pre-treatment agent is a water-soluble synthetic polymer having an average molecular weight (MW) <2 000 000 g/mol and selected from a group consisting of cationic polyacrylamide (PAM), glyoxalated polyacrylamide (GPAM), polyethyleneimine (PEI), polyamine, polyvinylamine (PVAM), polydiallyldimethylammonium chloride (poly-DADMAC), DADMAC-acrylamide copolymer, polyamidoamine epihalohydrin (PAE) and any of their mixtures,
    the charge density of the pre-treatment agent is 0.1-7 meq/g, determined at pH 7, whereby the pre-treatment agent is used as one single liquid solution comprising the water-soluble synthetic cationic polymer, and optionally other second or following polymers, and the pre-treatment agent is added to the aqueous mineral filler dispersion in an amount of 0.01-0.5 weight-%, calculated from the dry solids weight of the filler dispersion, whereby the floc size distribution of the filler dispersion is changed with the pre-treatment agent, so that the mean chord length value increases with 5-40% from the original mean chord length value.

2. Method according to claim 1, wherein the aqueous filler dispersion further comprises particles of at least one second different mineral filler, and 27 forming flocs, which comprise first mineral filler particles and second mineral filler particles.

3. Method according to claim 1, wherein the pre-flocculating agent comprises solely cationic polymers, preferably solely cationic synthetic polymers.

4. Method according to claim 1, wherein the pre-treatment agent is a water-soluble synthetic polymer having an average molecular weight (MW) in the range of 500 000-1 900 000 g/mol.

5. Method according to claim 1, wherein the charge density of the pre-treatment agent is 0.2-5 meq/g, determined at pH 7.

6. Method according to claim 1, wherein the pre-treatment agent is a cationic polyacrylamide having an average molecular weight (MW) in the range of 200 000-2 000 000 g/mol.

7. Method according to claim 6, wherein the charge density of the cationic polyacrylamide is 2-30 mol.

8. Method according to claim 1, wherein the pre-treatment agent is a mixture of two or several synthetic polymers, the first and second polymer having preferably different average molecular weight.

9. Method according to claim 8, wherein the pre-treatment agent comprises cationic polyacrylamide, and a second polymer having a lower molecular weight than the cationic polyacrylamide.

10. Method according to claim 1, wherein the first filler particles and the second filler particles have (a) different average particle size, D(50), (b) different chemical composition and/or (c) different crystal structure.

11. Method according to claim 10, wherein the ratio between the average particle sizes of the first mineral filler particles and the second mineral filler particles is 1.05-2.0.

12. Method according to claim 1, wherein the first mineral filler and/or the second mineral filler is selected from a group comprising ground calcium carbonate, precipitated calcium carbonate, clay, talc, gypsum, titanium dioxide, synthetic silicate, aluminum trihydrate, barium sulphate and magnesium oxide.

13. Method according to claim 12, wherein the first and second mineral filler is selected from the following combinations: GCC/clay and TiO$_2$/clay.

14. Method according to claim 1, wherein adding the pre-treatment agent to the mineral filler dispersion in amount <1000 g/ton total amount filler.

15. Method according to claim 1, wherein bringing the pre-treatment agent simultaneously into a contact with a first dispersion flow comprising the first mineral filler and a second dispersion flow comprising the 25 second mineral filler, whereafter the resulting dispersion of pre-treated filler is introduced to the stock of fibres.

16. Method according to claim 1, wherein adding the pre-treatment agent to white water, and circulating the white water back to the fibre stock preparation.

17. Method according to claim 1, wherein bringing the pre-treatment agent into a contact with the particles of the first and the second mineral filler in an environment which is substantially fibre free, i.e. comprising solely fibrous material having length of <0.2 mm.

18. Method according to claim 1, wherein adding the pre-treatment agent to the aqueous mineral filler dispersion in an amount of 0.02-0.1 weight-%, calculated from the dry solids weight of the filler dispersion.

19. Method according to claim 1, wherein adding also inorganic colloidal particles having an average particle size in water <100 nm to the mineral filler 10 dispersion in addition to the pre-treatment agent.

20. Method according to claim 19, wherein that the inorganic colloidal particles are at least partly negatively charged particles having an average maximum diameter in water in the range of 1 to 100 nm.

21. Method according to claim 19, wherein that the inorganic colloidal particles are selected from a group comprising colloidal silicate particles, such as synthetic silicates; silicates of Mg- and Al-type; colloidal silica, polysilicate microgel, polysilicic acid microgel and aluminum modified derivatives of these.

22. Use of a method according to claim 1 for producing super calendered (SC) paper, lightweight coated (LWC) paper, newsprint paper, fine paper, folding boxboard, white top linerboard or white lined chipboard.

* * * * *